United States Patent
Wiseman (10) Patent No.: US 10,570,063 B1
(45) Date of Patent: Feb. 25, 2020

(54) ZIRCONIA DISPERSION FOR USE IN FORMING NANO CERAMICS

(71) Applicant: Magnesium Elektron Limited, Manchester (GB)

(72) Inventor: William Wiseman, Manchester (GB)

(73) Assignee: Magnesium Elektron Limited, Manchester (GB)

(*) Notice: Subject to any disclaimer, the term of this patent is extended or adjusted under 35 U.S.C. 154(b) by 0 days.

(21) Appl. No.: 16/268,203

(22) Filed: Feb. 5, 2019

(51) Int. Cl.
| | |
|---|---|
| B01J 21/06 | (2006.01) |
| C04B 35/488 | (2006.01) |
| C04B 35/632 | (2006.01) |
| C04B 35/626 | (2006.01) |
| C04B 35/64 | (2006.01) |
| B28B 1/14 | (2006.01) |
| B28B 11/24 | (2006.01) |
| C08K 3/22 | (2006.01) |

(52) U.S. Cl.
CPC ............ *C04B 35/4885* (2013.01); *B28B 1/14* (2013.01); *B28B 11/243* (2013.01); *C04B 35/488* (2013.01); *C04B 35/6263* (2013.01); *C04B 35/632* (2013.01); *C04B 35/64* (2013.01); *B01J 2531/48* (2013.01); *C04B 2235/3217* (2013.01); *C04B 2235/3244* (2013.01); *C04B 2235/3246* (2013.01); *C04B 2235/5454* (2013.01); *C04B 2235/602* (2013.01); *C04B 2235/606* (2013.01); *C04B 2235/6567* (2013.01); *C04B 2235/725* (2013.01); *C08K 2003/2244* (2013.01)

(58) Field of Classification Search
CPC ......... C08K 2003/2244; B01J 2531/48; C04B 2235/3244
USPC .............................. 516/90, 922, 77; 423/608
See application file for complete search history.

(56) References Cited

U.S. PATENT DOCUMENTS

| | | | | |
|---|---|---|---|---|
| 5,037,579 A | * | 8/1991 | Matchett | .............. B01J 13/0004 423/608 |
| 5,571,492 A | * | 11/1996 | Yao | .......................... B01J 20/06 423/263 |

(Continued)

FOREIGN PATENT DOCUMENTS

| | | |
|---|---|---|
| EP | 0709351 A1 | 5/1996 |
| WO | WO-2009/085926 A2 | 7/2009 |

(Continued)

OTHER PUBLICATIONS

"Combined Search Report and Examination Report"; prepared for application No. GB1901560.1; dated Apr. 5, 2019; 8 pages.

(Continued)

*Primary Examiner* — Michael A Salvitti
(74) *Attorney, Agent, or Firm* — Winstead PC (57) ABSTRACT

This invention relates to an aqueous dispersion of nanoparticles, the nanoparticles comprising, on an oxide basis: (a) 85-100 wt % $ZrO_2+HfO_2$, (b) 0-15 wt % $Y_2O_3$, and (c) 0-2 wt % $Al_2O_3$, wherein the dispersion has a polydispersity index of 0.10-0.17. The invention also relates to a method of forming a ceramic article comprising the steps of: (a) pouring the aqueous dispersion into a mould, (b) drying the aqueous dispersion in the mould to form a green body, and (c) sintering the green body to form the ceramic article.

16 Claims, 5 Drawing Sheets

(56) References Cited

U.S. PATENT DOCUMENTS

| | | | | |
|---|---|---|---|---|
| 8,569,537 B2* | 10/2013 | Joly | ................... | C01G 25/02 |
| | | | | 560/115 |
| 8,829,079 B2* | 9/2014 | Shultz | ................... | B82Y 30/00 |
| | | | | 523/200 |
| 9,950,932 B2* | 4/2018 | Kolb | ................... | B82Y 30/00 |
| 2009/0105354 A1* | 4/2009 | Oswald | ................. | B82Y 30/00 |
| | | | | 516/98 |
| 2009/0120010 A1* | 5/2009 | Nonnet | ................. | B02C 17/20 |
| | | | | 51/307 |
| 2010/0276374 A1* | 11/2010 | Kolb | ................... | B82Y 30/00 |
| | | | | 210/681 |
| 2011/0053763 A1* | 3/2011 | Verdier | ............ | B01D 53/8628 |
| | | | | 502/242 |
| 2018/0297014 A1* | 10/2018 | Mohanan | .......... | B01D 53/9418 |

FOREIGN PATENT DOCUMENTS

| WO | WO-2012/087665 A2 | 6/2012 |
|---|---|---|
| WO | WO-2016/191534 A1 | 12/2016 |
| WO | WO-2018/151995 A1 | 8/2018 |

OTHER PUBLICATIONS

"International Search Report and Written Opinion"; prepared for application No. PCT/GB2019/050299; authorized officer Taddiano Fortunati; dated May 17, 2019; 20 pages.

\* cited by examiner

ZIRCONIA DISPERSION FOR USE IN FORMING NANO CERAMICS

This invention relates to aqueous dispersions of zirconia particles, the particles optionally comprising yttria and alumina, for use in the formation of nano ceramics.

BACKGROUND

Nano ceramics are ceramics which have a mean grain size in the range 1-200 nm. Advantages of nano ceramics are known and include that they exhibit greatly improved mechanical and optical properties along with other phenomena that traditional sub-micron ceramics do not exhibit. Work performed by Binner et al (US 2011/0230340 A1) asserts that yttrium doped zirconia ceramics with a mean grain size of 190 nm or less exhibit hydrothermal resistance along with excellent wear resistance properties. These enhanced properties make nano ceramics excellent materials for a wide range of applications including use in the electronics industry in phone cases, glasses and watch cases, in the abrasives market through tougher wearing materials and in the healthcare market such as in implants. One application of nano ceramics comprising zirconia is as a dental ceramic material. For example, US 2016/0095798 A1 and U.S. Pat. No. 9,820,917 B1 relate to zirconia dental ceramics which are formed from suspensions of zirconia nanoparticles, and gels made from such suspensions. The ceramics described in these documents are stated as having translucency, opalescence and desirable physical properties. US 2016/0095798 A1 also contains an extensive discussion of earlier patents relating to zirconia dental articles, as well as patents, patent applications and journal articles in the more general field of zirconia ceramics and processing methods.

The process of forming a zirconia dental article which is described in US 2016/0095798 A1 involves the steps of (i) forming a zirconia nanoparticle suspension into a suitable shape to form a wet zirconia green body, (ii) drying the wet green body to produce a zirconia green body, (iii) heating the zirconia green body to for a zirconia brown body, and (iv) sintering the zirconia brown body to form an opalescent zirconia sintered body.

A problem with drying nanomaterials such as those described in US 2016/0095798 A1 and U.S. Pat. No. 9,820,917 B1 is that the particles can aggregate and no longer possess the properties of a true nanoparticle. To try and overcome this problem, US 2016/0095798 A1 mentions in Example 6 subjecting the suspensions to 15 days drying to slow down the process. This process is not only time consuming but expensive should parts fail during the lengthy drying times.

A potential problem with this extended drying process is that when a dense green body has been formed, de-binding must occur to remove any organics or volatiles from the ceramic. A dense green body will result in smaller voids in the material and if these are not sufficiently large enough to allow the organics or volatiles to escape, pressure can build up inside the body and lead to cracking and failures in the resulting ceramics.

It is desirable to minimise the number of failures in the resulting ceramics in order to reduce the cost of producing zirconia nano ceramics. Methods and materials for reducing the failure rate of zirconia dental ceramics have therefore been sought.

SUMMARY OF THE INVENTION

This invention relates to an aqueous dispersion of nanoparticles, the nanoparticles comprising, on an oxide basis:

(a) 85-100 wt % in total of $ZrO_2+HfO_2$,
(b) 0-15 wt % $Y_2O_3$, and
(c) 0-2 wt % $Al_2O_3$, wherein the dispersion has a polydispersity index of 0.10-0.17.

It is desirable to tailor the dispersions of the invention to have the defined particle size properties in order to inhibit the particle packing model upon forming the green body. As such, the green density of the materials will be lower than conventional ceramics.

In the context of the invention, the term "nanoparticles" is used to refer to particles where, for 50% or more of the particles in the number size distribution, one or more external dimensions is in the size range 1 nm-100 nm. At the time of writing, this is the recommended definition of a nano material as described in "COMMISSION RECOMMENDATION of 18 Oct. 2011 on the definition of nano materials (2011/696/EU)".

Generally, a dispersion is a system in which solid particles are dispersed in a continuous phase of a different composition. The term "dispersion" is used in relation to the invention to refer to a system in which solid nanoparticles are dispersed in a liquid phase or medium (in this case, water). The dispersion may optionally comprise additives, such as surfactants, in order to increase the stability of the dispersion. Such additives are known to those skilled in the art. The term "nanodispersion" is used to refer to a dispersion of nanoparticles. The dispersions of the invention may be defined as a colloid, ie a dispersion of particles having at least one dimension in the size range 1 nm-1 µm. More particularly, the dispersions may be defined as a colloidal sol, ie a colloid where the dispersed phase is a solid and the continuous phase is a liquid.

In the context of the invention, the term aqueous is used to refer to a dispersion in which the liquid phase may comprise at least 75 wt % water, more particularly at least 90 wt % water, even more particularly at least 95 wt %. In some embodiments, the liquid phase may comprise at least 98 wt % water, more particularly substantially 100 wt % water. It may be necessary for the liquid phase to comprise a solvent, for example an organic solvent and specifically a polar solvent such as an alcohol.

In some embodiments, it may be beneficial to add a suitable dispersant to the dispersion, in particular for high solids contents (eg >35 wt %). A suitable dispersant is one which is capable of providing an electrostatic repulsion between nano particles, a steric interaction between particles or an electro-steric repulsion between particles. Examples of such dispersants include Amino Acids such as Glycine (2-Aminoethanoic acid), Alanine and its isomers (2-Aminopropanoic acid, 3-Aminopropanoic acid) and Valine and its isomers (D-2-Amino-3-methylbutanoic acid, L-2-Amino-3-methylbutanoic acid). In particular, the dispersant may be 3-Aminopropanoic acid.

In particular, the dispersion may comprise 0.5-6 wt % of a dispersant (based on oxide content), more particularly 1.0-4.0 wt %, even more particularly 1.5-3.0 wt %.

In particular, the nanoparticles may comprise, on an oxide basis, 90-100 wt % $ZrO_2+HfO_2$. More particularly, the nanoparticles may comprise, on an oxide basis, 0.5-10 wt % $Y_2O_3$, more particularly 1-9 wt % $Y_2O_3$. In particular, the nanoparticles may comprise, on an oxide basis, 0-1 wt % $Al_2O_3$, more particularly, 0-0.5 wt % $Al_2O_3$.

More particularly, the dispersion may have a nanoparticle content of 0.5-65 wt %, more particularly 10-63 wt %, even more particularly 20-62 wt %. In some embodiments, the dispersion may have a nanoparticle content of 50-60 wt %.

This may also be referred to as the solids content. The solids content can be varied by techniques such as, dilution, evaporation, membrane filtration, microfiltration, centrifugation. More particularly, the technique may be dilution, evaporation or membrane filtration.

In particular, the dispersion may have a polydispersity index of 0.11-0.16. More particularly, the polydispersity index (PDI) may be measured by dynamic light scattering (DLS).

More particularly, the dispersion may have a pH of 1-7, even more particularly 2-6, more particularly 3-5.

In particular, the dispersion may have a Z-average particle size of 30-60 nm, more particularly 35-55 nm, even more particularly 40-50 nm. In particular, the Z-average particle size may be measured by dynamic light scattering (DLS).

More particularly, the dispersion may have a Zeta potential of 20-50 mV, even more particularly 25-45 mV, more particularly 30-42 mV.

More particularly, any second or subsequent peak in the particle size distribution by intensity of the dispersion may have an intensity of 0-15%, even more particularly 0-10%. In relation to the invention, the term "second or subsequent peak" is used to refer to any peaks other than the highest intensity peak in a particle size by intensity distribution as measured by dynamic light scattering (DLS). The percentage is a measure of the area under the peak, ie if there are two peaks, peak 1 has an area of (100–x) and peak 2 has an area of x.

In particular, the dispersion may have a PDI width of 10-20 nm, more particularly 12-18 nm. More particularly, the PDI width may be measured by dynamic light scattering (DLS).

More particularly, the dispersion may have a particle size distribution as measured by intensity having a dl 0 value in the range 25-40 nm, even more particularly in the range 26-34 nm.

In particular, the dispersion may have a particle size distribution as measured by intensity having a d50 value in the range 35-60 nm, more particularly in the range 45-53 nm.

More particularly, the dispersion may have a particle size distribution as measured by intensity having a d90 value in the range 60-100 nm, even more particularly in the range 65-90 nm.

In particular, the d10, d50 and d90 may be measured by dynamic light scattering (DLS).

In particular, the green density of a green body formed from the dispersions of the invention by following the method Example 1 in US2016/0095798 is preferably <2.800 g/cm$^3$ and even more preferably, <2.760 g/cm$^3$. These green density figures are lower than that usually obtained by forming a green body from a powder. Without wishing to be bound to any theory, it is understood that this increases the survival rate of the green body during drying.

In particular, the dispersions may have a viscosity of <100 cPs, more particularly <30 cPs, even more particularly <20 cPs. More particularly, the viscosity may be measured using a shear rate of 200 s$^{-1}$ at 20° C.

According to a further aspect of the invention, there is provided a solid metal oxide obtainable by drying the dispersion described above. In particular, the metal oxide may be in the form of a powder. More particularly, the drying may be at 130° C. until a substantially constant mass is reached. In particular, the powder may be obtainable by grinding.

In particular, the nanoparticles may comprise a crystalline phase of monoclinic and combined tetragonal/cubic when measured by powder X-ray diffraction (XRD) between 10° and 85° 2theta.

In particular, the crystallite size of the nanoparticles may be 10-20 nm, more particularly 10-15 nm.

In particular, the nanoparticles may comprise a crystalline phase of monoclinic and tetragonal/cubic when measured by Raman spectroscopy.

It is desirable to control the level of minor constituents in ceramics, especially when used as a precursor to dental implants where colour is important. In some embodiments, it may be desirable to control minor constituents in the dispersion, such as Fe, Cr, Ni, Ce, Co, Mn, Er, Pr, Nd, Tb, Cu, Bi and their compounds such as oxides. More particularly, the amount of each of these minor constituents in the dispersion may individually be <20 ppm, even more particularly <10 ppm. This is because they can all add colour to sintered ceramics. More particularly, it may be desirable to control levels of Fe, Cr, Ni and Ce in the dispersion. In particular, the amount of each of these minor constituents in the dispersion may individually be <20 ppm, more particularly <10 ppm. The amounts of other elements in the dispersions may also need to be controlled to avoid detrimental sintering effects, for example Na, K, S, N, C, CI, Si and Ti, in particular Na, CI, Si and Ti. More particularly, the amount of each of these components in the dispersion may individually be <200 ppm, even more particularly <100 ppm.

In a further embodiment, this invention relates to a method of forming a ceramic article comprising the steps of:
(a) pouring the aqueous dispersion as described above into a mould,
(b) drying the aqueous dispersion in the mould to form a green body, and
(c) sintering the green body to form the ceramic article.
In particular, step (c) may comprise, after sintering, the steps of grinding and/or polishing the ceramic article. In some embodiments, the method may comprise, between steps (b) and (c), the step of pre-sintering the green body to remove any dispersant and form a pre-sintered body. Step (c) would then comprise sintering the pre-sintered body to form the ceramic article. More particularly, the method may comprise, after the pre-sintering step but before step (c), the step of shaping the pre-sintered body.

In particular, the composition of the nanoparticles of the invention can be varied in order to produce ceramics for a range of applications. Undoped $ZrO_2$ nanoparticle dispersions have applications in filtration and non-temperature sensitive applications. $Y_2O_3$ doped $ZrO_2$ nanoparticle dispersions offer a wide range of uses from structural applications, such as wear parts and abrasives, to functional applications such as oxygen sensors and fuel cells. It is therefore useful to control the $Y_2O_3$ level in the nanoparticle dispersion in order to control the phase of the material with regards to its crystal structure whilst retaining the desired Z-average particle size and polydispersity index (PDI).

BRIEF DESCRIPTION OF THE DRAWINGS

This invention will be further described by reference to the following Figures, which are not intended to limit the scope of the invention claimed, in which:

DETAILED DESCRIPTION

Examples

Nanodispersions were prepared as set out below. The dispersions were tested as set out below, with the results shown in Tables 2, 3 and 4 below.

Solids Content

A small portion of each was placed in an evaporation dish and put in a pre-heated oven set to 130° C. The dispersions were dried overnight until a constant weight was obtained. The solids content was obtained via the following equation:

% solids of dispersion=(dry weight of dispersion (g)/initial weight of dispersion (g))×100

Particle Size

Particle size measurements were made using a Malvern Zetasizer Nano ZS instrument, model ZEN3600, using a red laser of wavelength 633 nm. Each sample was first diluted to 0.5 wt. % using deionised water. 1 ml of the diluted sample was then placed in a DTS0012 disposable cuvette. The cuvette was loaded into the instrument and allowed to equilibrate to 25° C. A standard operating procedure (SOP) was created with the following parameters set: material refractive index 2.20, and material absorption value of 0.01 units. The dispersant refractive index (in this case, the continuous phase, ie water) was 1.33 and the dispersant viscosity was 0.8872 cP. The instrument was set to automatically adjust the laser position and attenuator settings to obtain the best measurement of particle size. A backscattering angle of 173° was used. The method of Dynamic Light Scattering (DLS) was used to calculate the particle size. A total of three measurements were taken with the cuvette being inverted between measurements. The three measurements were then averaged to give a final particle size result. The Z-average size or cumulant mean is a mean calculated from the intensity distribution and the calculation is based on assumptions that the particles are mono-modal, mono-dispersed and spherical. The polydispersity index (PDI) is a measure of the breadth of the particle size distribution and is calculated along with the Z-average size in the cumulant analysis of the intensity distribution. The PDI width is calculated by taking the square root of the PDI and multiplying this by the Z-average. The calculations for the Z-average size, polydispersity index and PDI width are defined in the ISO 22412:2017 "Particle size analysis—by Dynamic Light Scattering (DLS)".

Zeta Potential and Conductivity

Zeta potential and conductivity measurements were made using a Malvern Zetasizer Nano ZS instrument, model ZEN3600. Each sample was first diluted to 0.5 wt. % using deionised water and placed in a DTS1070 disposable folded capillary cell. The cell was loaded into the instrument and allowed to equilibrate to 25° C. A standard operating procedure (SOP) was created with the following parameters set: material refractive index 2.20, and material absorption value of 0.01 units. The dispersant refractive index was 1.33, the dispersant viscosity was 0.8872 cP and the dielectric constant was 78.5. The instrument was set to automatically adjust the number of runs taken and was set to take five sets of measurements with a thirty second delay between measurements. The five measurements were then averaged to give the final zeta potential and conductivity.

XRD/Crystallite Size

A small portion of each sample was placed in an evaporation dish and placed in a pre-heated oven set to 130° C. The sols were dried overnight until a constant weight was obtained. The dry mass was ground in a pestle and mortar and passed through a 250 micron sieve to create a uniform powder. The powder samples were loaded into a sample holder where a generous portion of powder was placed in the holder. The powder was pressed down firmly using a microscope slide to create a level surface, with any excess powder being removed. The samples were analysed via powder X-ray diffraction (XRD) using a Bruker D8 Advance with a Copper Kα radiation source (A=1.5418 Å) over a scan range of 10-85 degrees, a 2theta with a step size of 0.015 degrees 2theta and a 0.2 second duration per step with a 1 mm divergence slit. The recorded diffraction patterns were analysed using the Diffract Eva software to determine crystallite size by using the Scherrer method, K=0.9 and selecting the area between 26.0-33.0 degrees 2theta. Topas software was used to determine phase analysis whereas the default monoclinic, tetragonal and cubic structures were loaded into the software and each scan run against the defaults. Note tetragonal and cubic phases are reported combined in the examples.

Viscosity Measurements

Viscosity measurements were collected using the DIN 53019 coaxial cylinder—30 mm diameter and loaded with 20 ml of sample. Each sample was left to equilibrate to 20° C. by placing it in a water bath for thirty minutes before running the measurement. Measurements were carried out using a Bohlin Visco 88 Viscometer. Ten measurements would be taken at 200 $s^{-1}$ shear rate with an average being calculated. This procedure was carried out for all samples by diluting a small portion of the sols with deionised water to a solids content of 55.0 wt %. The measured solids content as described above was used to calculate the dilution to ensure all samples were tested under equivalent solids loadings.

Example 1

An aqueous dispersion of an yttrium doped zirconium hydrous oxide was prepared by taking XZO2738 a material grade from Luxfer MEL Technologies with a ratio of oxides of zirconium:yttrium:aluminium of 94.45:5.3:0.25, which was made up to 500 g using deionised water to give an total oxide content of 25% by weight. This dispersion had a starting particle size of 1.4 microns measured via laser diffraction. This dispersion was aged at >80° C. and subjected to at least 24 hours mixing under high shear (>1,000, 000 $s^{-1}$) in the presence of an amino acid dispersant (3-aminopropanoic acid), added at 2 wt % on oxide (ie 2 wt % relative to the weight of the oxide). The final concentration was increased to 56.0% solids using membrane filtration. The final particle size distribution of the dispersion, measured via DLS, was a Z-Ave of 43.7 nm, a PDI of 0.140 and a PDI Width of 16.4 nm. The powder XRD results gave a crystallite size of 12 nm and a phase analysis of 1.4% monoclinic and 98.6% tetragonal/cubic phase. A green body was prepared by following the method of Example 1 of US 2016/0095798 A1, resulting in a green density of 2.748 g/cm³. All of the green bodies survived de-binding and sintering at 1150° C. for 2 hours to form a crack free ceramic piece.

Example 2

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 58.0% solids using membrane filtration. The final particle size distribution of the dispersion, measured via DLS, was a Z-Ave of 46.8 nm, a PDI of 0.142 and a PDI Width of 17.6 nm. The powder XRD results gave a crystallite size of 12 nm and a phase analysis of 0.9% monoclinic and 99.1% tetragonal/cubic phase. A green body was prepared by following the method of Example 1 of US 2016/0095798 A1, resulting in a green density of 2.720 g/cm³. All of the green bodies survived de-binding and sintering at 1150° C. for 2 hours to form a crack free ceramic piece.

Example 3

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 59.5% solids using membrane filtration. The final particle size distribution of the dispersion, measured via DLS, was a Z-Ave of 42.8 nm, a PDI of 0.122 and a PDI Width of 15.0 nm. The powder XRD results gave a crystallite size of 12 nm and a phase analysis of 1.5% monoclinic and 98.5% tetragonal/cubic phase. A green body was prepared by following the method of Example 1 of US 2016/0095798 A1, resulting in a green density of 2.710 g/cm³. All of the green bodies survived de-binding and sintering at 1150° C. for 2 hours to form a crack free ceramic piece.

Example 4

An aqueous dispersion of a zirconium hydrous oxide was prepared by taking XZ02732, a material grade from Luxfer MEL Technologies with a ratio of oxides of zirconium:yttrium:aluminium of 100:0:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 57.5% solids using membrane filtration. The final particle size distribution of the dispersion, measured via DLS, was a Z-Ave of 45.0 nm, a PDI of 0.115 and a PDI Width of 15.3 nm. The powder XRD results gave a crystallite size of 14 nm and a phase analysis of 32.9% monoclinic and 67.1% tetragonal/cubic phase. A green body was prepared by following the method of Example 1 of US 2016/0095798 A1, resulting in a green density of 2.732 g/cm³. All of the green bodies survived de-binding and sintering at 1150° C. for 2 hours to form a crack free ceramic piece.

Example 5

An aqueous dispersion of an yttrium doped zirconium hydrous oxide was prepared by taking XZ02733, a material grade from Luxfer MEL Technologies with a ratio of oxides of zirconium:yttrium:aluminium of 98.2:1.8:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 57.5% solids using membrane filtration. The final particle size distribution of the dispersion, measured via DLS, was a Z-Ave of 46.1 nm, a PDI of 0.139 and a PDI Width of 17.2 nm. The powder XRD results gave a crystallite size of 13 nm and a phase analysis of 22.1% monoclinic and 77.9% tetragonal/cubic phase. A green body was prepared by following the method of Example 1 of US 2016/0095798 A1, resulting in a green density of 2.749 g/cm³. All of the green bodies survived de-binding and sintering at 1150° C. for 2 hours to form a crack free ceramic piece.

Example 6

An aqueous dispersion of an yttrium doped zirconium hydrous oxide was prepared by taking XZ02734, a material grade from Luxfer MEL Technologies with a ratio of oxides of zirconium:yttrium:aluminium of 96.4:3.6:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 57.0% solids using membrane filtration. The final particle size distribution of the dispersion, measured via DLS, was a Z-Ave of 42.4 nm, a PDI of 0.140 and a PDI Width of 15.8 nm. The powder XRD results gave a crystallite size of 13 nm and a phase analysis of 7.1% monoclinic and 92.9% tetragonal/cubic phase. A green body was prepared by following the method of Example 1 of US 2016/0095798 A1, resulting in a green density of 2.750 g/cm³. All of the green bodies survived de-binding and sintering at 1150° C. for 2 hours to form a crack free ceramic piece.

Example 7

An aqueous dispersion of an yttrium doped zirconium hydrous oxide was prepared by taking XZ02735, a material grade from Luxfer MEL Technologies with a ratio of oxides of zirconium:yttrium:aluminium of 94.7:5.3:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2 wt % on oxide. The final concentration was increased to 58.0% solids using membrane filtration. The final particle size distribution of the dispersion, measured via DLS, was a Z-Ave of 45.2 nm, a PDI of 0.116 and a PDI Width of 15.4 nm. The powder XRD results gave a crystallite size of 14 nm and a phase analysis of 2.3% monoclinic and 97.7% tetragonal/cubic phase. A green body was prepared by following the method of Example 1 of US 2016/0095798 A1, resulting in a green density of 2.725 g/cm$^3$. All of the green bodies survived de-binding and sintering at 1150° C. for 2 hours to form a crack free ceramic piece.

Example 8

An aqueous dispersion of an yttrium doped zirconium hydrous oxide was prepared by taking XZ02736, a material grade from Luxfer MEL Technologies with a ratio of oxides of zirconium:yttrium:aluminium of 92.9:7.1:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2.25 wt % on oxide. The final concentration was increased to 56.5% solids using membrane filtration. The final particle size distribution of the dispersion, measured via DLS, was a Z-Ave of 44.4 nm, a PDI of 0.159 and a PDI Width of 17.7 nm. The powder XRD results gave a crystallite size of 11 nm and a phase analysis of 0.8% monoclinic and 99.2% tetragonal/cubic phase. A green body was prepared by following the method of Example 1 of US 2016/0095798 A1, resulting in a green density of 2.731 g/cm$^3$. All of the green bodies survived de-binding and sintering at 1150° C. for 2 hours to form a crack free ceramic piece.

Example 9

An aqueous dispersion of an yttrium doped zirconium hydrous oxide was prepared by taking XZ02737, a material grade from Luxfer MEL Technologies with a ratio of oxides of zirconium:yttrium:aluminium of 91.2:8.8:0, which was made up to 500 g using deionised water to give an active content of 25% by weight. This dispersion was aged at >80° C. and subjected to at least 24 hours mixing under high shear in the presence of an amino acid dispersant (3-aminopropanoic acid), added at 2.5 wt % on oxide. The final concentration was increased to 59.5% solids using membrane filtration. The final particle size distribution of the dispersion, measured via DLS, was a Z-Ave of 43.5 nm, a PDI of 0.152 and a PDI Width of 17.0 nm. The powder XRD results gave a crystallite size of 11 nm and a phase analysis of 0.6% monoclinic and 99.4% tetragonal/cubic phase. A green body was prepared by following the method of Example 1 of US 2016/0095798 A1, resulting in a green density of 2.733 g/cm$^3$. All of the green bodies survived de-binding and sintering at 1150° C. for 2 hours to form a crack free ceramic piece.

Comparative Example 10

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged at >80° C. and subjected to at least 24 hours mixing under low shear (50,000 s$^{-1}$) in the presence of an amino acid dispersant (3-aminopropanoic acid), added at 2 wt % on oxide. The final concentration was increased to 57.0% solids using membrane filtration. The final particle size distribution of the dispersion, measured via DLS, was a Z-Ave of 73.2 nm, a PDI of 0.226 and a PDI Width of 34.8 nm. The powder XRD results gave a crystallite size of 11 nm and a phase analysis of 3.9% monoclinic and 96.1% tetragonal/cubic phase. A green body was prepared by following the method of Example 1 of US 2016/0095798 A1, resulting in a green density of 3.040 g/cm$^3$. Upon de-binding, all of the green bodies fractured inside of the furnace.

Comparative Example 11

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged at >80° C. and subjected to at least 24 hours mixing under lower shear (35,000 s$^{-1}$) in the presence of an amino acid dispersant (3-aminopropanoic acid), added at 2 wt % on oxide. The final concentration was increased to 57.0% solids using membrane filtration. The final particle size distribution of the dispersion, measured via DLS, was a Z-Ave of 93.3 nm, a PDI of 0.208 and a PDI Width of 42.6 nm. The powder XRD results gave a crystallite size of 11 nm and a phase analysis of 4% monoclinic and 96.0% tetragonal/cubic phase. A green body was prepared by following the method of Example 1 of US 2016/0095798 A1, resulting in a green density of 2.881 g/cm$^3$. Upon de-binding, all of the green bodies fractured inside of the furnace. This comparative example demonstrates the importance of using high shear mixing when preparing the dispersions of the invention.

Comparative Example 12

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged and subjected to milling for 1 hour as per patent U.S. Pat. No. 9,822,039 B1 Comparative Example 1, in the presence of an amino acid dispersant (3-aminopropanoic acid), added at 2 wt % on oxide. The final concentration was increased to 57.0% solids using membrane filtration. The final particle size distribution of the dispersion, measured via DLS, was a Z-Ave of 39.2 nm, a PDI of 0.180 and a PDI Width of 16.6 nm. The powder XRD results gave a crystallite size of 14 nm and a phase analysis of 6.0% monoclinic and 94.0% tetragonal/cubic phase. A green body was prepared by following the method of Example 1 of US 2016/0095798 A1, resulting in a green density of 2.881 g/cm$^3$. Upon de-binding, small cracks appeared inside the ceramic. Upon sintering at 1150° C. for 2 hours, the cracks propagated and the ceramics split into multiple pieces. This comparative example demonstrates the importance of the ageing and mixing techniques used when preparing the dispersions of the invention.

Comparative Example 13

An aqueous dispersion of an yttrium doped zirconium hydrous oxide was prepared by taking XZ02738, a material grade from Luxfer MEL Technologies with a ratio of oxides of zirconium:yttrium:aluminium of 94.45:5.3:0.25, which was made up to 500 g using deionised water to give an active content of 25% by weight. This dispersion was aged and subjected to milling for 2 hours as per patent U.S. Pat. No.

9,822,039 B1 Comparative Example 1, in the presence of an amino acid dispersant (3-aminopropanoic acid), added at 2 wt % on oxide. The final concentration was increased to 57.5% solids using membrane filtration. The final particle size distribution of the dispersion, measured via DLS, was a Z-Ave of 30.3 nm, a PDI of 0.181 and a PDI Width of 13.0 nm. The powder XRD results gave a crystallite size of 13 nm and a phase analysis of 2.4% monoclinic and 97.6% tetragonal/cubic phase. A green body was prepared by following the method of Example 1 of US 2016/0095798 A1, resulting in a green density of 2.873 g/cm$^3$. Upon de-binding, small cracks appeared inside the ceramic. Upon sintering at 1150° C. for 2 hours, the cracks propagated and the ceramics split into multiple pieces. This comparative example is the same as Comparative Example 12 except that the milling time is 2 hours.

The compositions of the nanodispersions are summarised in Table 1 below:

TABLE 1

| Sample Name | $ZrO_2$ + $HfO_2$ wt % | $Y_2O_3$ wt % | $Al_2O_3$ wt % |
|---|---|---|---|
| Example 1 | 94.45 | 5.3 | 0.25 |
| Example 2 | 94.45 | 5.3 | 0.25 |
| Example 3 | 94.45 | 5.3 | 0.25 |
| Example 4 | 100 | 0 | 0 |
| Example 5 | 98.2 | 1.8 | 0 |
| Example 6 | 96.4 | 3.6 | 0 |
| Example 7 | 94.7 | 5.3 | 0 |
| Example 8 | 92.9 | 7.1 | 0 |
| Example 9 | 91.2 | 8.8 | 0 |
| Comparative Example 10 | 94.45 | 5.3 | 0.25 |
| Comparative Example 11 | 94.45 | 5.3 | 0.25 |
| Comparative Example 12 | 94.45 | 5.3 | 0.25 |
| Comparative Example 13 | 94.45 | 5.3 | 0.25 |

TABLE 2

| Sample Name | Z-Ave (d.nm) | PdI | Pk 1 Mean Int (d.nm) | Pk 2 Mean Int (d.nm) | Pk 1 Area Int (%) | Pk 2 Area Int (%) | D(i)10 (nm) | D(i)50 (nm) | D(i)90 (nm) | D(i)95 (nm) | D(i)99 (nm) | PdI Width (d.nm) | Solids % @ 130° C. | pH | Zeta Potential (mV) |
|---|---|---|---|---|---|---|---|---|---|---|---|---|---|---|---|
| Example 1 Average | 43.7 | 0.140 | 50.5 | 0 | 100 | 0 | 28.0 | 46.4 | 79.5 | 90.9 | 116 | 16.4 | 56.0 | 4.5 | 38.7 |
| Example 2 Average | 46.8 | 0.142 | 54.7 | 0 | 100 | 0 | 29.3 | 51.1 | 86.9 | 98.4 | 119 | 17.6 | 58.0 | 4.0 | 40.1 |
| Example 3 Average | 42.8 | 0.122 | 47.0 | 0 | 100 | 0 | 31.2 | 45.3 | 66.1 | 73.3 | 86.4 | 15.0 | 59.5 | 4.2 | 40.2 |
| Example 4 Average | 45.0 | 0.115 | 50.5 | 0 | 100 | 0 | 31.3 | 48.0 | 74.5 | 83.2 | 100 | 15.3 | 57.5 | 3.3 | 41.5 |
| Example 5 Average | 46.1 | 0.139 | 53.5 | 0 | 100 | 0 | 32.1 | 50.6 | 79.4 | 89.4 | 107 | 17.2 | 57.5 | 4.2 | 40.2 |
| Example 6 Average | 42.4 | 0.140 | 49.9 | 0 | 100 | 0 | 27.2 | 45.1 | 75.6 | 87.7 | 162 | 15.8 | 57.0 | 3.9 | 31.9 |
| Example 7 Average | 45.2 | 0.116 | 48.6 | 0 | 100 | 0 | 32.7 | 47.0 | 67.4 | 74.6 | 86.8 | 15.4 | 58.0 | 4.0 | 37.0 |
| Example 8 Average | 44.4 | 0.159 | 51.6 | 0 | 100 | 0 | 26.6 | 48.7 | 81.9 | 91.1 | 110 | 17.7 | 56.5 | 4.3 | 39.7 |
| Example 9 Average | 43.5 | 0.152 | 48.6 | 0 | 100 | 0 | 29.5 | 45.9 | 72.7 | 81.2 | 99.5 | 17.0 | 59.5 | 4.2 | 36.1 |

TABLE 3

| Sample Name | Z-Ave (d.nm) | PdI | Pk 1 Mean Int (d.nm) | Pk 2 Mean Int (d.nm) | Pk 1 Area Int (%) | Pk 2 Area Int (%) | D(i)10 (nm) | D(i)50 (nm) | D(i)90 (nm) | D(i)95 (nm) | D(i)99 (nm) | PdI Width (d.nm) | Solids % @ 130° C. | pH | Zeta Potential (mV) |
|---|---|---|---|---|---|---|---|---|---|---|---|---|---|---|---|
| Comparative Example 10 Average | 73.2 | 0.226 | 104.4 | 36.7 | 79.1 | 20.9 | 34.8 | 90.7 | 148 | 164 | 194 | 34.8 | 57.0 | 4.1 | 44.7 |
| Comparative Example 11 Average | 93.3 | 0.208 | 118.7 | 38.7 | 88.9 | 11.1 | 49.5 | 108 | 174 | 192 | 232 | 42.6 | 57.0 | 4.0 | 43.1 |
| Comparative Example 12 Average | 39.2 | 0.180 | 46.8 | 15.9 | 91.6 | 8.4 | 24.7 | 43.8 | 66.2 | 73.4 | 86.3 | 16.6 | 57.0 | 4.4 | 43.7 |
| Comparative Example 13 | 30.3 | 0.181 | 33.0 | 0 | 100 | 0 | 21.9 | 32.0 | 46.1 | 50.0 | 57.6 | 13.0 | 57.5 | 4.5 | 45.6 |

TABLE 4

| Sample Name | Viscosity/cP |
| --- | --- |
| Example 1 | 4.6 |
| Example 2 | 9.3 |
| Example 3 | 7.6 |
| Example 4 | 8.9 |
| Example 5 | 4.5 |
| Example 6 | 9.1 |
| Example 7 | 5.8 |
| Example 8 | 10.9 |
| Example 9 | 9.7 |
| Comparative Example 10 | 135 |
| Comparative Example 11 | 176 |
| Comparative Example 12 | 8.4 |
| Comparative Example 13 | 9.6 |

Figure 1:
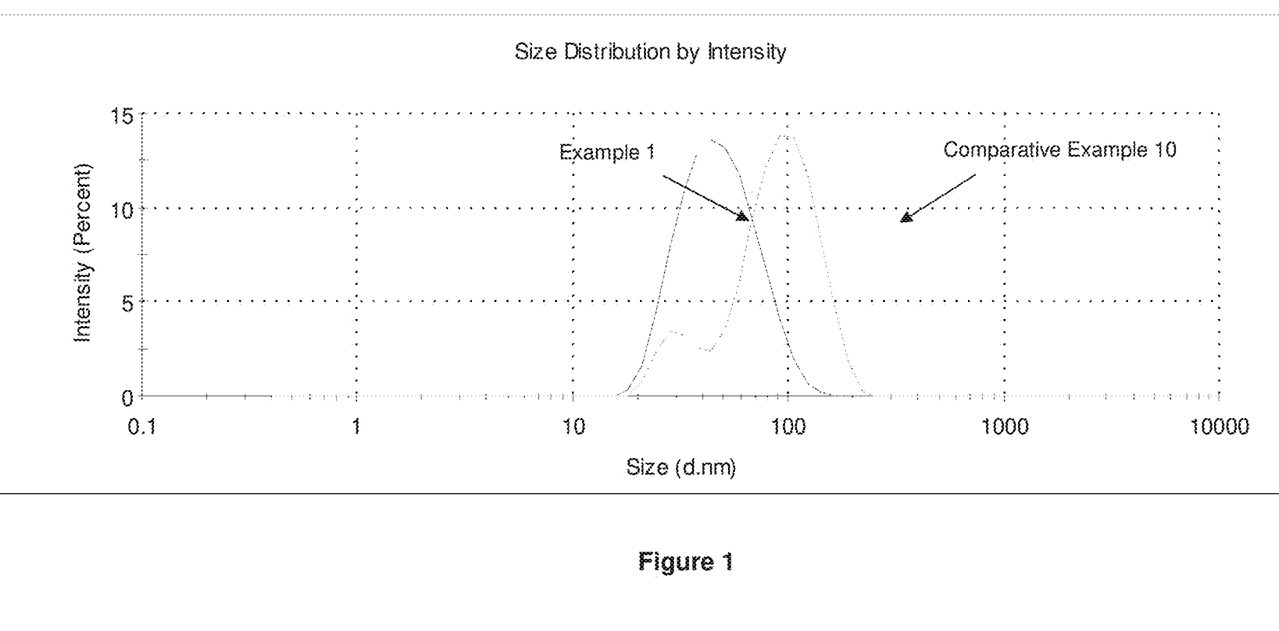
FIG. 1 shows a graph of particle size distribution by intensity for Example 1 and Comparative Example 10.
Figure 2:
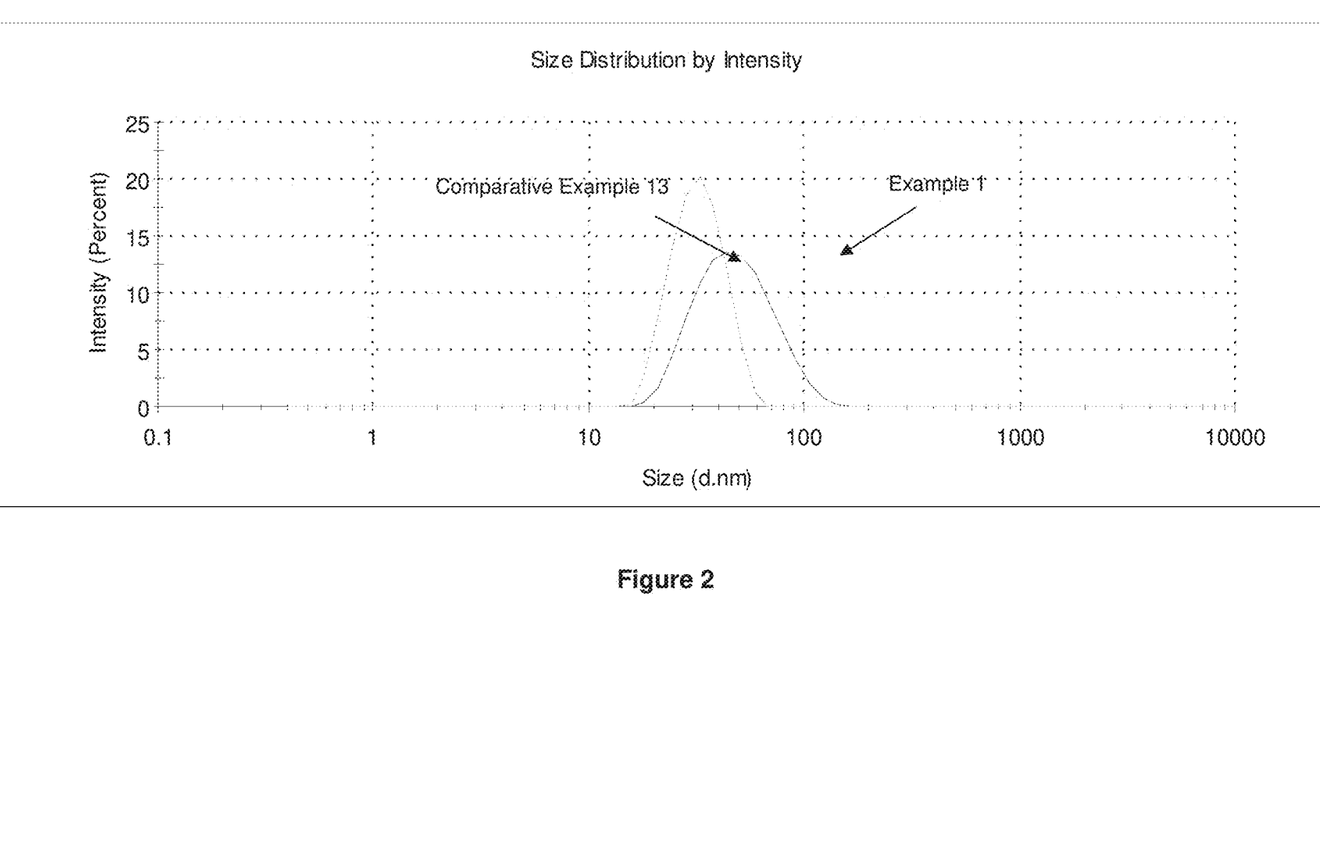
FIG. 2 shows a graph of particle size distribution by intensity for Example 1 and Comparative Examples 13.

In relation to the figures, FIG. 1 compares particle size by intensity graphs for Example 1 and Comparative Example 10. This shows a monomodal peak of smaller size for Example 1 compared to the bimodal and larger size peak for Comparative Example 10. FIG. 2 shows a similar comparison for Examples 1 and Comparative Example 13. In this case, this shows the larger size peak achieved by Example 1.

Figure 3:
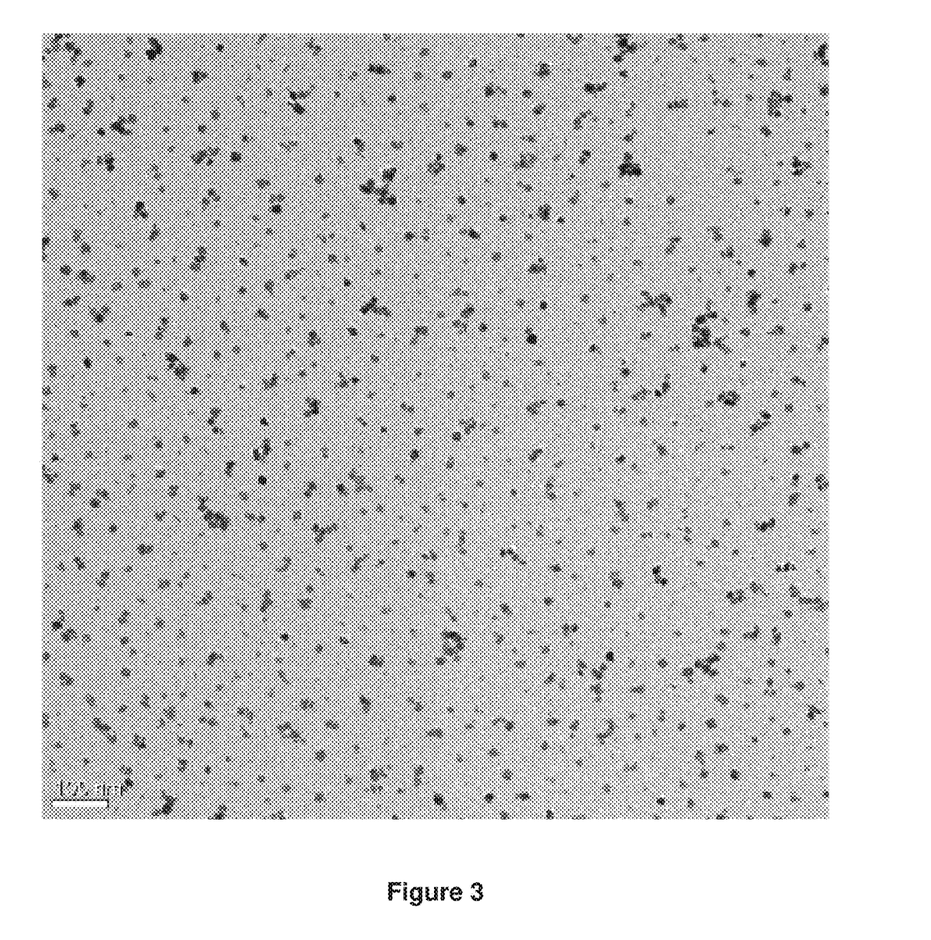
FIG. 3 shows a TEM image of dried particles of Example 1.

FIG. 3 shows a TEM image of the dried particles obtained in Example 1. This confirms that the particle size distribution is close to that measured by DLS, as well as highlighting the narrow distribution of the particles.

Figure 4:
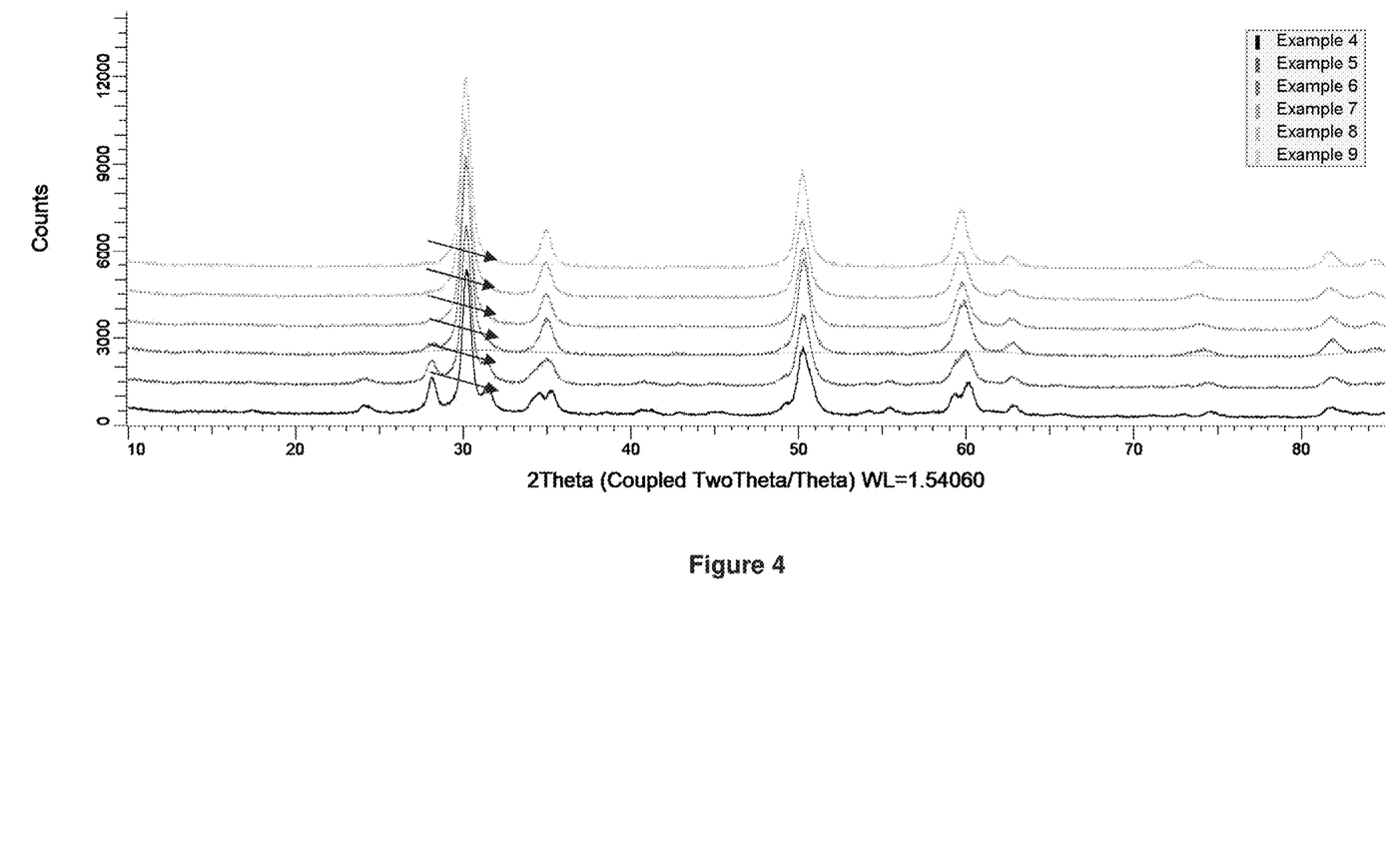
FIG. 4 shows XRD overlays of Examples 4-9 showing the elimination of monoclinic phase in the materials.

The XRD overlays in FIG. 4 show the crystallinity of the nanoparticles of the invention. The arrows in FIG. 4 indicate the reduction in the 28 2theta peak relating to the monoclinic phase as the level of $Y_2O_3$ is increased through Examples 4-9.

Figure 5:
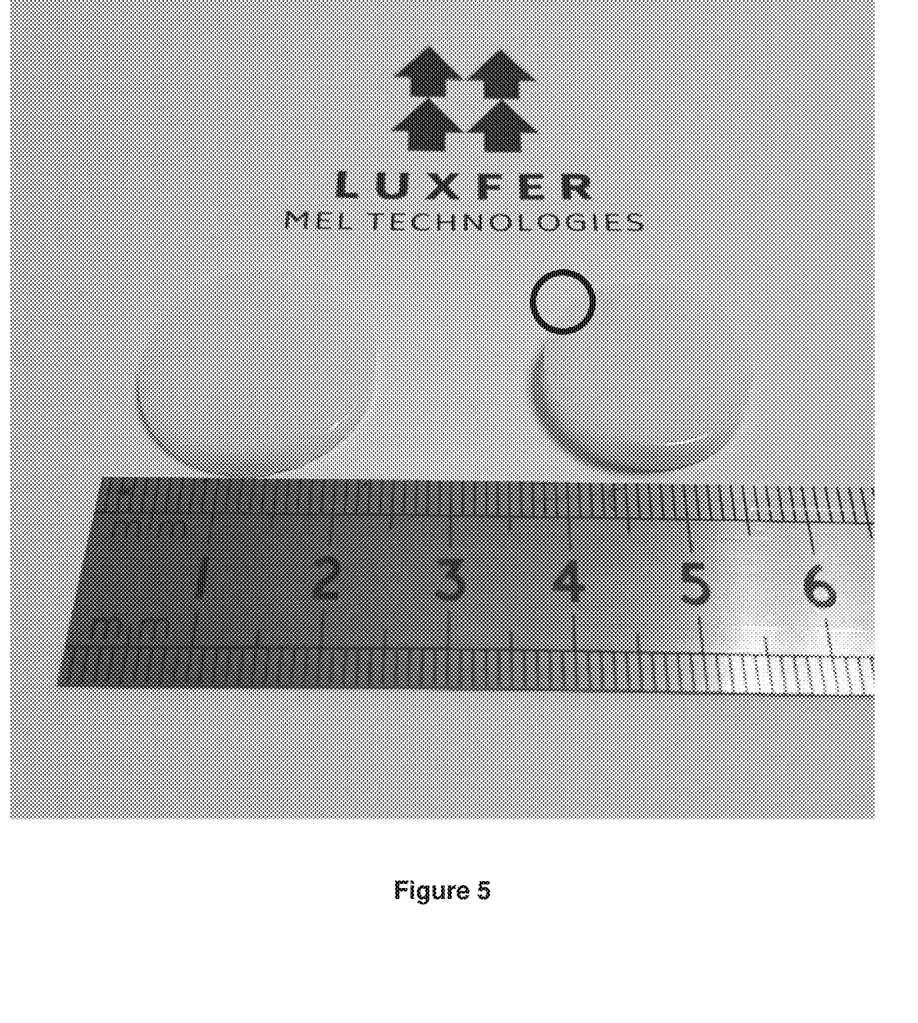
FIG. 5 shows a the green bodies of Example 1 (left) and Comparative Example 10 (right) showing the difference in green density.

FIG. 5 is a photograph of green bodies formed in accordance with Example 1 (left) and Comparative Example 10 (right). As is clearly indicated, the left disc is wide and thin, whereas the right one is taller and narrower. Also, the green body formed by Comparative Example 10 had a crack in it, indicated by the circle in FIG. 5. This is understood to be due to the packing of the particles in the respective green bodies. The left disc (Example 1) has a narrower particle size range (essentially, more particles of a similar size). These particles pack together leaving voids in the green body for moisture/organics to escape during drying. This allows the green body to dry quicker and retain its shape. In contrast, the right disc (Comparative Example 10) has a bimodal particle size distribution, allowing smaller particles to fit into the voids around the larger particles. This means that the green body dries slower, the outside of the disc drying first whilst the middle retains moisture and then contracts. This results in a taller, narrower disc.

What is claimed is:

1. An aqueous dispersion of nanoparticles, the nanoparticles comprising, on an oxide basis:
   (a) 85-100 wt % $ZrO_2+HfO_2$;
   (b) 0-15 wt % $Y_2O_3$;
   (c) 0-2 wt % $Al_2O_3$; and
   wherein the dispersion has a polydispersity index of 0.10-0.17, a nanoparticle content of 20-65 wt %, and a crystallite size of 10-20 nm.

2. The aqueous dispersion of nanoparticles of claim 1, wherein the polydispersity index of the dispersion is 0.11-0.16.

3. The aqueous dispersion of nanoparticles of claim 1, wherein the dispersion has a Z-average particle size of 30-60 nm.

4. The aqueous dispersion of nanoparticles of claim 1, wherein the nanoparticles comprise, on an oxide basis, 0.5-10 wt % $Y_2O_3$ and 0-1 wt % $Al_2O_3$.

5. The aqueous dispersion of nanoparticles of claim 1, wherein any second or subsequent peak in particle size distribution by intensity of the dispersion has an intensity of 0-15%.

6. The aqueous dispersion of nanoparticles of claim 1, wherein the dispersion has a PDI width of 10-20 nm.

7. The aqueous dispersion of nanoparticles of claim 1, wherein the dispersion has a particle size distribution as measured by intensity having a d10 value in a range of 25-40 nm.

8. The aqueous dispersion of nanoparticles of claim 1, wherein the dispersion has a particle size distribution as measured by intensity having a d50 value in a range of 35-60 nm.

9. The aqueous dispersion of nanoparticles of claim 1, wherein the dispersion has a particle size distribution as measured by intensity having a d90 value in a range of 60-100 nm.

10. The aqueous dispersion of nanoparticles of claim 1, wherein the dispersion comprises 0.5-6 wt % of a dispersant based on oxide content.

11. The aqueous dispersion of nanoparticles of claim 10, wherein the dispersant is an amino acid.

12. The aqueous dispersion of nanoparticles of claim 1, wherein the dispersion has a viscosity of <100 cPs.

13. The aqueous dispersion of nanoparticles of claim 1, wherein an amount of each of Fe, Cr, Ni and Ce in the dispersion is individually <20 ppm.

14. The aqueous dispersion of nanoparticles of claim 1, wherein the dispersion has a zeta potential of 20-50 mV.

15. An aqueous dispersion of nanoparticles, the nanoparticles comprising, on an oxide basis:
   (a) 85-100 wt % $ZrO_2+HfO_2$;
   (b) 0.5-15 wt % $Y_2O_3$;
   (c) 0-2 wt % $Al_2O_3$; and
   wherein the dispersion has a polydispersity index of 0.10-0.17 and a crystallite size of 10-20 nm.

16. The aqueous dispersion of nanoparticles of claim 15, wherein the dispersion has a nanoparticle content of 20-65 wt %.

* * * * *